(12) United States Patent
Li et al.

(10) Patent No.: US 12,551,843 B1
(45) Date of Patent: Feb. 17, 2026

(54) DESULFURIZATION AND DENITRIFICATION AGENT AND APPLICATION THEREOF

(71) Applicants: China University of Petroleum, Shandong (CN); China shi da Education Development Co., Ltd, Shandong (CN)

(72) Inventors: Binglin Li, Shandong (CN); Yuliang Su, Shandong (CN); Binfei Li, Shandong (CN); Chao Zhang, Shandong (CN); Shouya Wu, Shandong (CN)

(73) Assignees: China University of Petroleum, Dongying (CN); China shi da Education Development Co., Ltd, Qingdao (CN)

( * ) Notice: Subject to any disclaimer, the term of this patent is extended or adjusted under 35 U.S.C. 154(b) by 0 days.

(21) Appl. No.: 19/004,516

(22) Filed: Dec. 30, 2024

Related U.S. Application Data

(63) Continuation of application No. PCT/CN2024/081452, filed on Mar. 13, 2024.

(30) Foreign Application Priority Data

Jul. 24, 2023 (CN) .......................... 202310907063.4

(51) Int. Cl.
    *B01D 53/14* (2006.01)
    *B01D 53/50* (2006.01)
    (Continued)

(52) U.S. Cl.
    CPC ..... *B01D 53/1493* (2013.01); *B01D 53/1481* (2013.01); *B01D 53/501* (2013.01);
    (Continued)

(58) Field of Classification Search
    None
    See application file for complete search history.

(56) References Cited

U.S. PATENT DOCUMENTS 5,055,586 A    10/1991    Kim et al.

FOREIGN PATENT DOCUMENTS

CN    104080524 A    10/2014
CN    105169921 A    * 12/2015
(Continued)

OTHER PUBLICATIONS

CN105169921A_ENG (Expacent machine translation of Li) (Year: 2015).*

(Continued)

*Primary Examiner* — Gabriel E Gitman

(57) ABSTRACT

A desulfurization and denitrification agent and application thereof are provided, belonging to the fields of flue gas purification and purified product recycling. In the present disclosure, an imidazoline amine oxide is used as a desulfurization and denitrification agent, which can oxidize $NO_x$ and $SO_x$ into $HNO_3$ and $H_2SO_4$. Meanwhile, after the agent is reduced, double bonded tertiary nitrogen atoms in the agent can be used as a base for neutralizing $H_2SO_4$ and $HNO_3$. In addition, in the present disclosure, the imidazoline amine oxide is used as the desulfurization and denitrification agent for two-stage desulfurization and denitrification of flue gas. Waste liquid produced after the reaction is injected as foaming acid liquid into carbonate and tight sandstone reservoirs, and slowly hydrolyzed into $H_2SO_4$, $HNO_3$, and HF at the reservoir temperature, and the produced acid reacts with the reservoirs to augment production and injection of the reservoirs.

9 Claims, 2 Drawing Sheets

(51) Int. Cl.
*B01D 53/56* (2006.01)
*B01D 53/60* (2006.01)
*C07D 487/14* (2006.01)
*C07D 498/18* (2006.01)
*C09K 8/72* (2006.01)
*E21B 36/00* (2006.01)
*E21B 41/00* (2006.01)
*E21B 43/27* (2006.01)

(52) U.S. Cl.
CPC ............ *B01D 53/507* (2013.01); *B01D 53/56* (2013.01); *B01D 53/60* (2013.01); *C07D 487/14* (2013.01); *C07D 498/18* (2013.01); *C09K 8/72* (2013.01); *E21B 36/001* (2013.01); *E21B 41/0057* (2013.01); *E21B 43/27* (2020.05); *B01D 2251/10* (2013.01); *B01D 2257/302* (2013.01); *B01D 2257/404* (2013.01); *B01D 2258/0283* (2013.01)

(56) References Cited

FOREIGN PATENT DOCUMENTS

| | | |
|---|---|---|
| CN | 105802662 A | 7/2016 |
| CN | 113137215 A | 7/2021 |
| CN | 116621847 A | 8/2023 |
| DE | 19944996 A1 | 3/2001 |

OTHER PUBLICATIONS

International Search Report of PCT Patent Application No. PCT/CN2024/081452 issued on Jun. 28, 2024.

Written Opinion of the International Searching Authority of PCT Patent Application No. PCT/CN2024/081452 issued on Jun. 28, 2024.

\* cited by examiner

DESULFURIZATION AND DENITRIFICATION AGENT AND APPLICATION THEREOF

CROSS-REFERENCE TO RELATED APPLICATIONS

The present application is a continuation application of PCT application No. PCT/CN2024/081452 filed on Mar. 13, 2024, which claims the benefit of Chinese Patent Application No. 202310907063.4 filed on Jul. 24, 2023. The contents of all of the aforementioned applications are incorporated by reference herein in their entirety.

FIELD OF THE INVENTION

The present disclosure relates to the fields of flue gas purification and purified product recycling, and specifically, to a desulfurization and denitrification agent and application thereof.

BACKGROUND OF THE INVENTION

Flue gas contains polluting gases such as $NO_x$ and $SO_x$. In order to control air pollution, desulfurization and denitrification are necessary: Desulfurization and denitrification methods include selective catalytic reduction (SCR), selective non-catalytic reduction (SNCR), selective catalytic oxidation (SCO), alkali absorption, and oxidation absorption. The alkali absorption method is only applicable to $NO_2$ and $SO_2$, not to NO. While SCO and oxidation absorption methods are highly effective in removing NO, they require expensive oxidizing agents and catalysts, and easily cause poisoning in the presence of $SO_2$. SCR and SNCR methods require high reaction temperatures and expensive catalysts, and improper handling of their reductants and by-products will lead to secondary pollution. Therefore, developing and exploring a cost-effective and broadly applicable desulfurization and denitrification method that minimizes secondary pollution has become an important research topic in the art.

In the Chinese patent CN113137215A, THEED or bipy is used as a desulfurization and denitrification agent, and a product of flue gas desulfurization and denitrification is used for carbonate reservoir acidification, which not only overcomes the defect of secondary pollution caused by the conventional desulfurization and denitrification agent, but also can prepare acid liquid at a low cost for carbonate reservoir acidification to augment production and injection of the reservoir. However, the desulfurization and denitrification product of the patent will be hydrolyzed at high temperature in a tubing string to corrode the tubing string, making it impossible to divert.

SUMMARY OF THE INVENTION

In view of the deficiencies in the prior art, the present disclosure provides a desulfurization and denitrification agent and application thereof. In the present disclosure, an imidazoline amine oxide is used for two-stage desulfurization and denitrification of flue gas, and waste liquid produced by desulfurization and denitrification and liquid nitrogen are used for reservoir stimulation. In this way, environmental pollution can be better controlled, and the same agent can be used for multiple purposes, thereby reducing the cost of carbonate reservoir acidification, and realizing slow acidification and diversion acidification at the same time. The following problems in the prior art are solved: first, the applicable range of the existing desulfurization and denitrification process is limited, and the cost and energy consumption are high, and a desulfurization and denitrification product cannot be effectively used and will easily cause secondary pollution; second, during conventional acid fracturing, the acid-rock reaction rate is too fast, the action distance is short, and it is difficult for an acid to enter a reservoir with low permeability, resulting in low blockage removal efficiency; third, in mud acid, HF, $HBF_4$, and the like are dangerous to use and will easily cause secondary precipitation; and fourth, the desulfurization and denitrification product will be hydrolyzed at high temperature in a tubing string to corrode the tubing string, and the action distance is not long.

In order to achieve the foregoing objectives, the present disclosure adopts the following technical solutions.

The present disclosure provides a desulfurization and denitrification agent, which is an imidazoline amine oxide. The imidazoline amine oxide includes two quaternary ammonium nitrogen atoms and a tetrafluoroborate.

Preferably, the imidazoline amine oxide is $[MiO_2][BF_4]_2$ or $[MsO_2][BF_4]_2$.

Waste liquid produced by desulfurization and denitrification using the foregoing desulfurization and denitrification agent is used for reservoir acidification, and components of the waste liquid may chelate with $Ca^{2+}$ and $Mg^{2+}$ to form a polycyclic structure.

More preferably, the desulfurization and denitrification agent is $[MsO_2][BF_4]_2$. Waste liquid produced by desulfurization and denitrification using $[MsO_2][BF_4]_2$ contains phenoxy groups that may coordinate with $Al^{3+}$ and $Fe^{3+}$ to improve an effect of dissolving sandstone.

A chemical formula of $[MiO_2][BF_4]_2$ is:

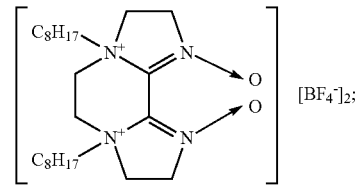

and a chemical formula of $[MsO_2][BF_4]_2$ is:

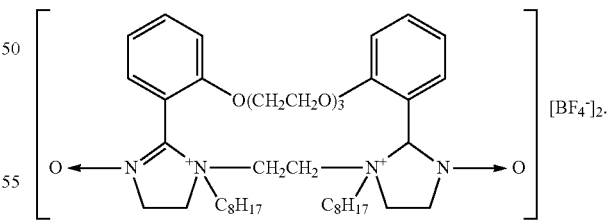

A synthesis method of the desulfurization and denitrification agent includes the following steps: taking triethylenetetramine as a raw material, and dropwise adding oxalic acid or salicylic acid to react so as to obtain a gemini imidazoline intermediate; then dropwise adding 1-fluorooctane and boron trifluoride in sequence to react so as to obtain quaternized gemini imidazolinium; and finally, adding hydrogen peroxide as an oxidizing agent to oxidize so as to obtain a desulfurization and denitrification agent.

Specifically, a synthesis method of [MiO$_2$][BF$_4$]$_2$ includes the following steps:

(1) Preparation of a gemini imidazoline intermediate: adding triethylenetetramine into a reactor, heating to 100-120° C., dropwise adding oxalic acid in a molar ratio of triethylenetetramine to oxalic acid of 1:(1-1.4) within 0.5 h, heating to 150° C. until no water is generated, heating to 240-260° C., reacting for 8 h, after the reaction, distilling under reduced pressure at 100° C. for 5 h to remove by-products so as to obtain a gemini imidazoline intermediate.

A specific process is as follows:

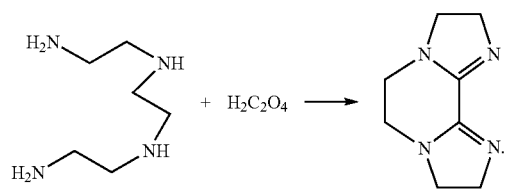

(2) Preparation of [Mi][BF$_4$]$_2$: placing the gemini imidazoline intermediate in a three-neck flask, using isopropanol as a solvent, and heating in a thermostatic water bath at 90° C.; dropwise adding 1-fluorooctane while stirring the solution within 0.5 h and dropwise adding boron trifluoride within 0.5 h in a molar ratio of the gemini imidazoline intermediate to 1-fluorooctane to boron trifluoride of 1:(0.9-1.1):(0.9-1.1); after boron trifluoride is dropwise added, allowing the solution to react for 1 h, dropwise adding a 5 wt % NaOH solution to regulate a pH value of the solution to 8-10; and stirring for reaction for 4 h, and distilling under reduced pressure to obtain [Mi][BF$_4$]$_2$.

A specific process is as follows:

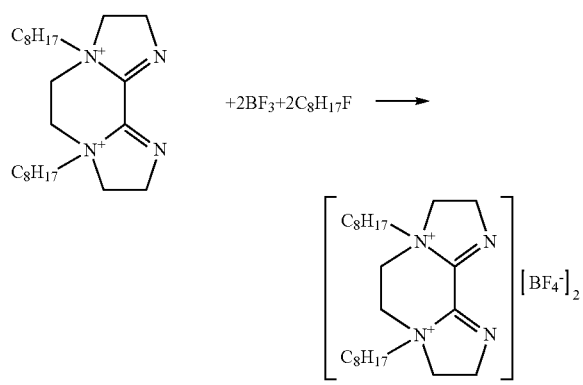

(3) Preparation of [MiO$_2$][BF$_4$]$_2$: uniformly mixing [Mi][BF$_4$]$_2$ and a 10-30 wt % H$_2$O$_2$ solution, and reacting for 1 h to obtain [MiO$_2$][BF$_4$]$_2$.

A specific process is as follows:

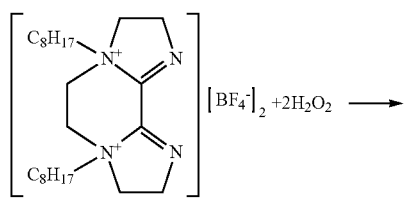

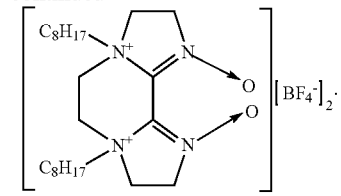

Specifically, a synthesis method of [MsO$_2$][BF$_4$]$_2$ includes the following steps:

(1) Preparation of a gemini imidazoline intermediate: adding triethylenetetramine into a reactor, heating to 100-120° C., dropwise adding salicylic acid in a molar ratio of triethylenetetramine to salicylic acid of 1:(0.5-0.7) within 0.5 h, heating to 150° C. until no water is generated, heating to 240-260° C., and reacting for 8 h. After the reaction, distilling under reduced pressure at 100° C. for 5 h to remove by-products so as to obtain a gemini imidazoline intermediate.

A specific process is as follows:

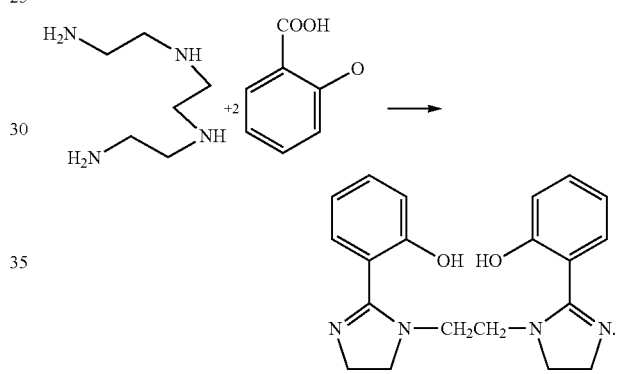

(2) Preparation of [Ms][BF$_4$]$_2$: placing the gemini imidazoline intermediate in a three-neck flask, using isopropanol as a solvent, and heating in a thermostatic water bath at 90° C.; dropwise adding 1-fluorooctane while stirring the solution within 0.5 h and dropwise adding boron trifluoride within 0.5 h in a molar ratio of the gemini imidazoline intermediate to 1-fluorooctane to boron trifluoride of 1:(0.9-1.1):(0.9-1.1); after boron trifluoride is dropwise added, allowing the solution to react for 1 h, dropwise adding a 5 wt % NaOH solution to regulate a pH value of the solution to 8-10; and stirring for reaction for 4 h, and distilling under reduced pressure to obtain quaternized gemini imidazolinium [Ms][BF$_4$]$_2$.

A specific process is as follows:

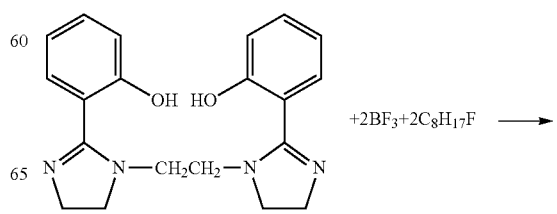

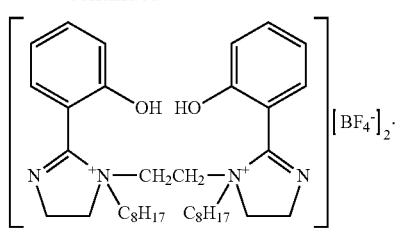

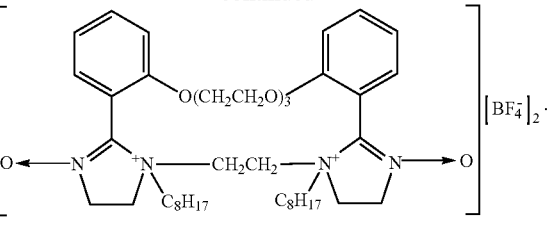

Adding LiOH to quaternized gemini imidazolinium in a molar ratio of quaternized gemini imidazolinium to LiOH of 1:(2-4), stirring the solution in 60 mL of tetrahydrofuran and 10 mL of water, heating to 70° C. for reflux for 1 h. Adding triglycol dichloride in a molar ratio of quaternized gemini imidazolinium to triglycol dichloride of 1:(0.8-1.2), and reacting for 72 h. After the reaction, removing tetrahydrofuran by rotary evaporation, washing residues with water, extracting with chloroform, removing tetrahydrofuran by rotary evaporation, and crystallizing with heptane to obtain [Ms][BF$_4$]$_2$.

A specific process is as follows:

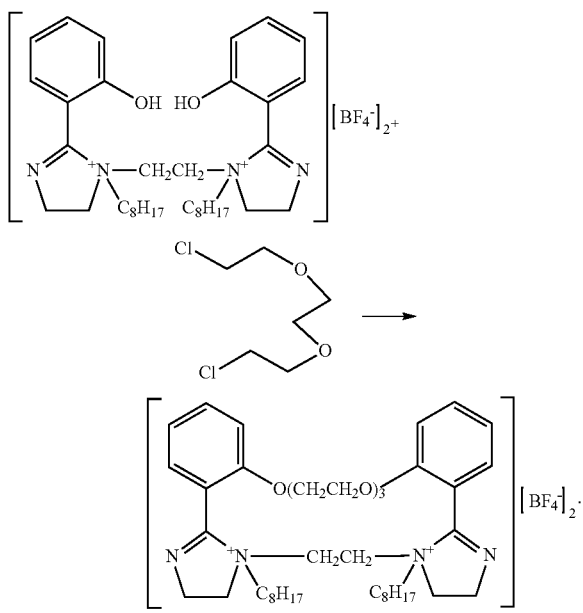

(3) Preparation of [MsO$_2$][BF$_4$]$_2$: uniformly mixing [Ms][BF$_4$]$_2$ with a 10-30 wt % H$_2$O$_2$ solution, and reacting for 1 h to obtain [MsO$_2$][BF$_4$]$_2$.

A specific process is as follows:

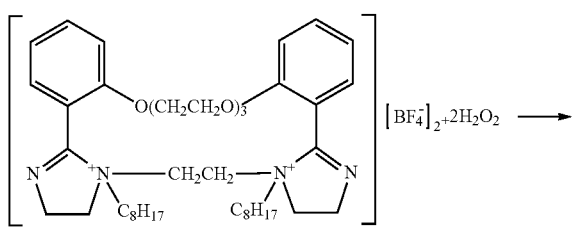

The present disclosure further provides application of the foregoing desulfurization and denitrification agent. The desulfurization and denitrification agent is applied to desulfurization and denitrification of flue gas and recycling of a purified product. The application includes a flue gas desulfurization and denitrification process and a reservoir acidification process.

(1) The flue gas desulfurization and denitrification process includes the following steps:
spraying the foregoing desulfurization and denitrification agent into flue gas in a direction opposite to a flow direction of the flue gas at two stages to obtain waste liquid; and collecting the waste liquid produced by desulfurization and denitrification in a case that a pH value of the waste liquid reaches 6-6.5.

At the first stage, desulfurization is mainly performed; and at the second stage, denitrification is mainly performed.

The waste liquid produced at the first stage is named waste liquid 1, and the waste liquid produced at the second stage is named waste liquid 2.

(2) The reservoir acidification process includes the following steps:
from far to near relative to an oil well, injecting a slug 1, a slug 2, a slug 3, and a slug 4 in sequence to augment production and injection.

The slug 1 is liquid nitrogen and used to cool a wellbore and an immediate vicinity of wellbore.

The slug 2 is the waste liquid 2, which may prevent precipitation of ions such as Ca$^{2+}$ and Mg$^{2+}$ due to the small content of sulfate in the slug.

The slug 3 is the waste liquid 1 and used to augment production and injection of the reservoir.

The slug 4 is liquid nitrogen and used to facilitate foam generation in acid liquid to enhance energy.

In the present disclosure, after the waste liquid slug, the liquid nitrogen slug is added, which facilitates foam generation in the waste liquid, and realizes diversion through the Jamin effect.

Specifically, the flue gas desulfurization and denitrification process is performed at two stages. At the first stage, the desulfurization and denitrification agent reacts with SO$_x$ first, the desulfurization rate is higher than the denitrification rate. Flue gas entering the second stage mainly contains NO, and thus denitrification is mainly performed at the second stage. At each stage, a desulfurization and denitrification agent solution of the process (1) or the process (2) is sprayed into flue gas in a direction opposite to a flow direction of the flue gas. An air heat exchange pipe is arranged at each stage, and air flows through the second stage and first stage air heat exchange pipes in sequence, and finally enters a furnace. The desulfurization and denitrification reactions are exothermic reactions, the reaction heat is absorbed by air, which is conducive to the right shift of the desulfurization and denitrification reactions, and achieves the effect of preheating air. After the pH value of the waste liquid reaches 6-6.5, the waste liquid produced by desulfurization and denitrification is collected. The waste liquids produced at the first stage and the second stage are the waste liquid 1 and the waste liquid 2, respectively. As shown in FIG. 1, the desulfurization and denitrification agent oxidizes $NO_x$ and $SO_x$ into $H_2SO_4$ and $HNO_3$, and meanwhile, the agent is reduced into $[Mi][BF_4]_2$ or $[Ms][BF_4]_2$ that serves as a base for neutralizing $H_2SO_4$ and $HNO_3$. The obtained waste liquid contains a mixture of a nitrate, a sulfate, and a tetrafluoroborate of $[H_2Mi]^{4+}$ or $[H_2Ms]^{4+}$ with a mass fraction of 0.010% to 0.025%.

Preferably, the desulfurization and denitrification agent is an aqueous solution of $[MiO_2][BF_4]_2$ with a mass fraction of 0.020 wt %, or an aqueous solution of $[MsO_2][BF_4]_2$ with a mass fraction of 0.020 wt %.

Preferably, the pH value of the waste liquid produced by desulfurization and denitrification is 6.5.

As shown in FIG. 2, operating steps of the reservoir acidification process are specifically as follows:

before acidification, injecting liquid nitrogen into a target layer as a slug 1 for cooling a wellbore and an immediate vicinity of wellbore according to an injection amount of 0.1-0.3 $m^3$ per meter of oil layer, and preferably, 0.2 $m^3$ per meter of oil layer;

injecting the waste liquid 2 as a front slug 2 according to an injection amount of 10-50 $m^3$ per meter of oil layer, and preferably, 15 $m^3$ per meter of oil layer, for preventing precipitation of ions such as $Ca^{2+}$ and $Mg^{2+}$ due to the small content of sulfate in the slug;

injecting the waste liquid 1 as a slug 3 according to an injection amount of 20-100 $m^3$ per meter of oil layer, and preferably, 80 $m^3$ per meter of oil layer; and finally, injecting liquid nitrogen as a slug 4 according to an injection amount of 1-1.5 $m^3$ per meter of oil layer, and preferably, 1.2 $m^3$ per meter of oil layer.

An injection rate of each slug is 100-250 L/min, and preferably, 200 L/min.

The waste liquid 1 mainly contains a mixture of a nitrate and a tetrafluoroborate of $[H_2Mi]^{4+}$ or $[H_2Ms]^{4+}$ with a mass fraction of 0.010% to 0.025%, and the waste liquid 2 contains a mixture of a nitrate, a sulfate, and a tetrafluoroborate of $[H_2Mi]^{4+}$ or $[H_2Ms]^{4+}$ with a mass fraction of 0.010% to 0.025%. At the reservoir temperature, the nitrate and the sulfate in the waste liquid are slowly hydrolyzed into $H_2SO_4$ and $HNO_3$, and the tetrafluoroborate is hydrolyzed into HF, which may slowly acidify sandstone. Meanwhile, $[Mi]^{2+}$ or $[Ms]^{2+}$ coordinates with $Ca^{2+}$, $Mg^{2+}$, $Fe^{3+}$, and the like to play a role in corrosion inhibition and stabilization of iron ions in pipelines.

Action Principles:

In the present disclosure, the imidazoline amine oxide $[MiO_2][BF_4]_2$ or $[MsO_2][BF_4]_2$ is used to replace the conventional oxidizing agents, bases, and catalysts and used for two-stage desulfurization and denitrification of flue gas. The desulfurization and denitrification agent is an oxidation product of the gemini imidazoline quaternary ammonium salt $[Mi][BF_4]_2$ or $[Ms][BF_4]_2$. $[Mi][BF_4]_2$ or $[Ms][BF_4]_2$ has two double bonded tertiary nitrogen atoms that easily coordinate with $H^+$, $Ca^{2+}$, $Mg^{2+}$, $Fe^{3+}$, and the like, and is easily oxidized into an amine oxide structure. In the present disclosure, the amine oxide desulfurization and denitrification agent is used for multiple purposes. The desulfurization and denitrification agent oxidizes $NO_x$ and $SO_x$ into $HNO_3$ and $H_2SO_4$, and meanwhile, it is reduced to $[Mi][BF_4]_2$ or $[Ms][BF_4]_2$ in which double bonded tertiary nitrogen atoms are used as a base for neutralizing $H_2SO_4$ and $HNO_3$. The waste liquid produced by desulfurization and denitrification, that is, the mixture of the nitrite, the sulfate, and the tetrafluoroborate of $[H_2Mi]^{4+}$ or $[H_2Ms]^{4+}$, is used as acid fluid for acidification of a reservoir. The liquid nitrogen slugs are added before and after the waste liquid slugs. In this way, the temperature of a wellbore and an immediate vicinity of wellbore is reduced to prevent rapid hydrolysis of the mixed salt and corrosion of a tubing string, making it safe to use. Meanwhile, liquid nitrogen increases the energy and foaming capacity of the waste liquid, which has a better production and injection augmenting effect on low-permeability pore throats. At the reservoir temperature, the nitrate and the sulfate in the waste liquid is slowly hydrolyzed into $HNO_3$ and $H_2SO_4$, and the tetrafluoroborate is hydrolyzed into HF, so that sandstone is slowly acidified. Meanwhile, $[Mi]^{2+}$ or $[Ms]^{2+}$ coordinates with $Ca^{2+}$, $Mg^{2+}$, $Fe^{3+}$, and the like to play a role in corrosion inhibition and stabilization of iron ions in pipelines, thereby promoting hydrolysis of the nitrate and the sulfate in the reservoir.

One or more technical solutions provided in embodiments of the present disclosure at least have the following technical effects:

(1) The present disclosure adopts the imidazoline amine oxide as a desulfurization and denitrification agent for desulfurization and denitrification of flue gas for the first time, which can not only control air and water pollution, but also save energy consumption and cost of flue gas treatment and improve the desulfurization and denitrification rate.

(2) In the present disclosure, the waste liquid produced by desulfurization and denitrification is used as acid liquid for reservoir stimulation, and liquid nitrogen is used to cool a wellbore and an immediate vicinity of wellbore to inhibit hydrolysis of $[H_2Mi]^{4+}$ or $[H_2Ms]^{4+}$, which has basically no corrosion effect on pipelines. $[Mi][BF_4]_2$ or $[Ms][BF_4]_2$ can be better adsorbed onto pipe walls and has a long action distance, thereby achieving the effect of corrosion inhibition and speed reduction. Meanwhile, $[Mi][BF_4]_2$ or $[Ms][BF_4]_2$ has a longer aliphatic chain, the waste liquid produced by desulfurization and denitrification is used as a foaming agent, liquid nitrogen facilitates foam generation in the waste liquid, and after stimulation, the homogeneity of the reservoir is higher.

(3) In the present disclosure, $[BF_4]^-$ is used to replace HF for dissolving sandstone, which can not only achieve the effect of speed reduction, but also increase the operation safety.

DETAILED DESCRIPTION OF THE EMBODIMENTS

Figure 1:
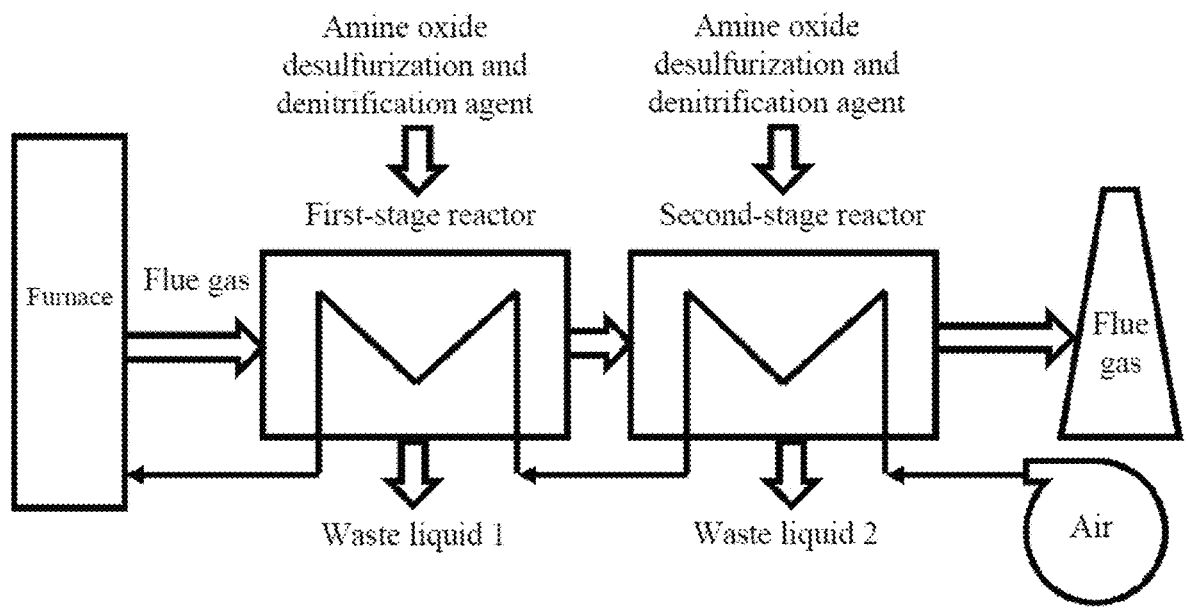
FIG. 1 is a flowchart of desulfurization and denitrification.
Figure 2:
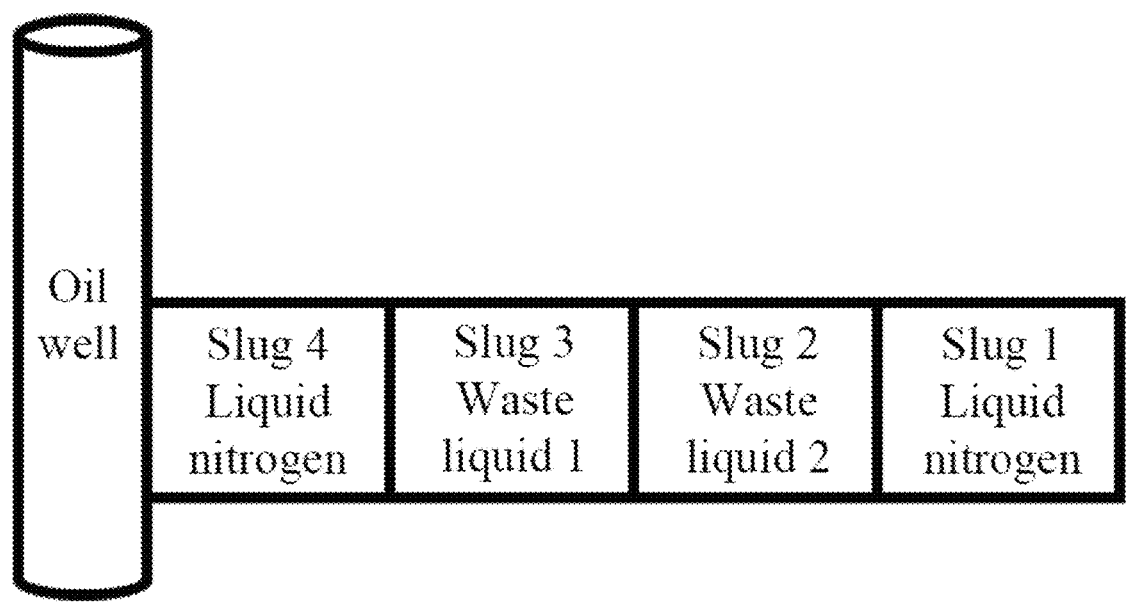
FIG. 2 is a schematic diagram of slugs for augmenting production and injection.

The present disclosure will be further described below with reference to specific embodiments, but is not limited to the following embodiments.

It is to be noted that experimental methods in the following embodiments are conventional methods unless otherwise specified; and reagents, materials, and equipment are commercially available unless otherwise specified.

A preparation of $[MiO_2][BF_4]_2$ includes the following steps:

triethylenetetramine is added to a reactor and heated to 110° C., oxalic acid is dropwise added in a molar ratio of triethylenetetramine to oxalic acid of 1:1.2 within 0.5 h, and the reaction solution is heated to 150° C. for continuous reaction until no water is generated, and heated to 260° C. for continuous reaction for 8 h. After the reaction, the reaction solution is distilled under reduced pressure at 100° C. for 5 h to remove by-products so as to obtain a gemini imidazoline intermediate. The gemini imidazoline intermediate is placed in a three-neck flask, isopropanol is used as a solvent, and the solution is heated in a thermostatic water bath at 90° C.; 1-fluorooctane is dropwise added within 0.5 h while the solution is stirred; boron trifluoride is dropwise added within 0.5 h; a molar ratio of the gemini imidazoline intermediate to 1-fluorooctane to boron trifluoride is 1:1.1:1.05; the reaction solution reacts for 1 h after boron trifluoride is dropwise added, and a 5 wt % NaOH solution is dropwise added to regulate a pH value of the solution to 9; and the reaction solution is stirred for reaction for 4 h, and distilled under reduced pressure to obtain $[Mi][BF_4]_2$. $[Mi][BF_4]_2$ is uniformly mixed with a 20 wt % $H_2O_2$ solution, and the reaction solution reacts for 1 h to obtain $[MiO_2][BF_4]_2$. A molar ratio of $[Mi][BF_4]_2$ to $H_2O_2$ is 1:3.

A synthesis method of $[MsO_2][BF_4]_2$ includes the following steps:

triethylenetetramine is added to a reactor and heated to 115° C., salicylic acid is dropwise added in a molar ratio of triethylenetetramine to salicylic acid of 1:0.6 within 0.5 h, and the reaction solution is heated to 150° C. for continuous reaction until no water is generated, and heated to 255° C. for continuous reaction for 8 h. After the reaction, the reaction solution is distilled under reduced pressure at 100° C. for 5 h to remove by-products so as to obtain a gemini imidazoline intermediate. The gemini imidazoline intermediate is placed in a three-neck flask, isopropanol is used as a solvent, and the solution is heated in a thermostatic water bath at 90° C.: 1-fluorooctane is dropwise added within 0.5 h while the solution is stirred; boron trifluoride is dropwise added within 0.5 h: a molar ratio of the gemini imidazoline intermediate to 1-fluorooctane to boron trifluoride is 1:1.1:1.05; the reaction solution reacts for 1 h after boron trifluoride is dropwise added, and a 5 wt % NaOH solution is dropwise added to regulate a pH value of the solution to 10; and the reaction solution is stirred for reaction for 4 h, and distilled under reduced pressure to obtain quaternized gemini imidazolinium.

LiOH is added to quaternized gemini imidazolinium in a molar ratio of quaternized gemini imidazolinium to LiOH of 1:3, and the solution is stirred in 60 mL of tetrahydrofuran and 10 ml of water, and heated to 70° C. for reflux for 1 h. Triglycol dichloride is added in a molar ratio of quaternized gemini imidazolinium to triglycol dichloride of 1:1, and the reaction solution reacts for 72 h. After the reaction, tetrahydrofuran is removed by rotary evaporation, residues are washed with water and extracted with chloroform, tetrahydrofuran is removed by rotary evaporation, and the residues are crystallized with heptane to obtain $[Ms][BF_4]_2$. $[Ms][BF_4]_2$ is uniformly mixed with a 20 wt % $H_2O_2$ solution, and the reaction solution reacts for 1 h to obtain $[MsO_2][BF_4]_2$. A molar ratio of $[Mi][BF_4]_2$ to $H_2O_2$ is 1:3.

Example 1

Application of a desulfurization and denitrification agent to desulfurization and denitrification of flue gas and recycling of a purified product included the following steps:
(1) A flue gas desulfurization and denitrification process: desulfurization and denitrification was performed at two stages. At each stage, an aqueous solution of 0.020 wt % $[MiO_2][BF_4]_2$ was sprayed into flue gas in a direction opposite to a flow direction of the flue gas, an air heat exchange pipe was arranged at each stage, and air flowed through the second stage and first stage air heat exchange pipes in sequence, and finally entered a furnace. After a pH value of the system reached 6.5, waste liquid produced by desulfurization and denitrification was collected. The waste liquid produced at the first stage was named waste liquid 1, and the waste liquid produced at the second stage was named waste liquid 2. The waste liquid was acid liquid.
(2) A reservoir acidification process: before acidification, liquid nitrogen was injected into a target layer as a slug 1 according to an injection amount of 0.2 m³ per meter of oil layer. The waste liquid 2 was injected as a front slug 2 according to an injection amount of 15 m³ per meter of oil layer. The waste liquid 1 was injected as a slug 3 according to an injection amount of 80 m³ per meter of oil layer. Finally, liquid nitrogen was injected as a slug 4 according to an injection amount of 1.2 m³ per meter of oil layer. An injection rate of each slug was 200 L/min. The waste liquid 1 mainly contained a mixture of a nitrate and a tetrafluoroborate of $[H_2Mi]^{4+}$ or $[H_2Ms]^{4+}$ with a mass fraction of 0.020%, and the waste liquid 2 contained a mixture of a nitrate, a sulfate, and a tetrafluoroborate of $[H_2Mi]^{4+}$ or $[H_2Ms]^{4+}$ with a mass fraction of 0.020%.

The dissolution rate and corrosion rate of debris in the acid liquid were detected according to Formation Damage Evaluation by Flow Test (SY/T 5358-2002). Steps for detecting the dissolution rate and corrosion rate of debris in different acid systems were as follows:

5 g of debris was placed in a test tube containing 500 mL of acid liquid, the test tube was placed in a water bath at 90° C., the debris thoroughly reacted with the acid liquid for 120 min, and filtered, and the dissolution rate of debris was calculated. According to the coupon weight loss method, a coupon was subjected to rust removal and oil removal, dried, weighed, immersed in the acid liquid, taken out after 120 min, washed for removing remaining acid liquid, dried, and weighed, and the corrosion rate was calculated. Results are shown in Table 1.

Example 2

Application of a desulfurization and denitrification agent to desulfurization and denitrification of flue gas and recycling of a purified product included the following steps:
(1) A flue gas desulfurization and denitrification process: desulfurization and denitrification was performed at two stages. At each stage, a 0.020 wt % $[MsO_2][BF_4]_2$ solution was sprayed into flue gas in a direction opposite to a flow direction of the flue gas, an air heat exchange pipe was arranged at each stage, and air flowed through the second stage and first stage air heat exchange pipes in sequence, and finally entered a furnace. After a pH value of the system reached 6.5, waste liquid produced by desulfurization and denitrification was collected. The waste liquid produced at the first stage was named waste liquid 1, and the waste liquid produced at the second stage was named waste liquid 2. The waste liquid was acid liquid.

(2) A reservoir acidification process: before acidification, liquid nitrogen was injected into a target layer as a slug 1 according to an injection amount of 0.2 m$^3$ per meter of oil layer. The waste liquid 2 was injected as a front slug 2 according to an injection amount of 15 m$^3$ per meter of oil layer. The waste liquid 1 was injected as a slug 3 according to an injection amount of 80 m$^3$ per meter of oil layer. Finally, liquid nitrogen was injected as a slug 4 according to an injection amount of 1.2 m$^3$ per meter of oil layer. An injection rate of each slug was 200 L/min. The dissolution rate and corrosion rate of debris in the acid liquid were detected by the method in Example 1. Results are shown in Table 1.

Contrast 1

(1) A flue gas desulfurization and denitrification process: 0.015% THEED was added to a 15% $H_2O_2$ solution to prepare a mixed solution, a volume ratio of THEED to $H_2O_2$ was 75:1, the mixed solution was sprayed into flue gas in a direction opposite to a flow direction of the flue gas, and after a pH value of the system reached 6.5, waste liquid produced by desulfurization and denitrification was collected. The waste liquid was acid liquid.

(2) The obtained acid liquid was directly injected into the formation to augment production and injection. The acid liquid contained approximately 0.015% $[H_2THEED]^{2+}$. The dissolution rate and corrosion rate of debris in the acid liquid were detected by the method in Example 1. Results are shown in Table 1.

Contrast 2

(1) A flue gas desulfurization and denitrification process: 0.015% bipy was added to a 15% $H_2O_2$ solution to prepare a mixed solution, a volume ratio of bipy to $H_2O_2$ was 400:3, the mixed solution was sprayed into flue gas in a direction opposite to a flow direction of the flue gas, and after a pH value of the system reached 6.5, waste liquid produced by desulfurization and denitrification was collected. The waste liquid was acid liquid.

(2) The obtained acid liquid was directly injected into the formation to augment production and injection. The acid liquid contained approximately 0.015% $[H_2bipy]^{2+}$. The dissolution rate and corrosion rate of debris in the acid liquid were detected by the method in Example 1. Results are shown in Table 1.

Contrast 3

(1) A flue gas desulfurization and denitrification process: desulfurization and denitrification was performed at two stages. At each stage, 0.015% THEED was added to a 15% $H_2O_2$ solution to prepare a mixed solution, a volume ratio of THEED to $H_2O_2$ was 75:1, the mixed solution was sprayed into flue gas in a direction opposite to a flow direction of the flue gas, an air heat exchange pipe was arranged at each stage, and air flowed through the second stage and first stage air heat exchange pipes in sequence, and finally entered a furnace. After a pH value of the system reached 6.5, waste liquid produced by desulfurization and denitrification was collected. The waste liquid produced at the first stage was named waste liquid 1, and the waste liquid produced at the second stage was named waste liquid 2. The waste liquid was acid liquid.

(2) A reservoir acidification process: before acidification, liquid nitrogen was injected into a target layer as a slug 1 according to an injection amount of 0.2 m$^3$ per meter of oil layer. The waste liquid 2 was injected as a front slug 2 according to an injection amount of 15 m$^3$ per meter of oil layer. The waste liquid 1 was injected as a slug 3 according to an injection amount of 80 m$^3$ per meter of oil layer. Finally, liquid nitrogen was injected as a slug 4 according to an injection amount of 1.2 m$^3$ per meter of oil layer. An injection rate of each slug was 200 L/min. The dissolution rate and corrosion rate of debris in the acid liquid were detected by the method in Example 1. Results are shown in Table 1.

It can be seen from Contrast 1 and Contrast 2 that in Example 1, the desulfurization and denitrification agent in the patent CN113137215A is replaced with $[MiO_2][BF_4]_2$, the dissolution rate is increased by 0.616 times compared with Contrast 1 and nearly 1.176 times compared with Contrast 2; and the corrosion rate is 91% of that of Contrast 1 and 98% of that of Contrast 2. In Example 2, the desulfurization and denitrification agent in the patent CN113137215A is replaced with $[MsO_2][BF_4]_2$, the dissolution rate is increased by 0.864 times compared with Contrast 1 and nearly 1.511 times compared with Contrast 2; and the corrosion rate is 86% of that of Contrast 1 and 93% of that of Contrast 2.

In addition, it can be seen from Contrast 3 that THEED does contain a tetrafluoroborate, and may not be hydrolyzed into HF that may dissolve sandstone when heated. Although liquid nitrogen is used to cool a wellbore and an immediate vicinity of wellbore, the hydrolysis inhibition effect is not significant. THEED is less likely to form stable coordination compounds with $Ca^{2+}$, $Mg^{2+}$, $Fe^{3+}$, $Al^{3+}$, and the like, and thus, the corrosion inhibition and speed reduction effect is not as significant as that of $[H_2Ms]^{4+}$ or $[H_2Mi]^{4+}$. Moreover, $[H_2Ms]^{4+}$ or $[H_2Mi]^{4+}$ contains a hydrophobic functional group that can produce foam when exposed to liquid nitrogen to achieve the effect of diversion, and thus has a more significant corrosion inhibition and speed reduction effect. However, THEED, as a desulfurization and denitrification agent, produces $[H_2THEED]^{2+}$ that does not contain an aliphatic chain, does not produce foam when exposed to liquid nitrogen, and cannot block a large pore throat through the Jamin effect, and the acidified formation has high heterogeneity. The dissolution rate of Contrast 3 is 70% of that of Example 1 and 60% of that of Example 2; and the corrosion rate is increased by 0.034 times compared with Example 1 and 0.091 times compared with Example 2. The dissolution rate of Contrast 3 is increased by 0.127 times compared with Contrast 1, and the corrosion rate is 94% of that of Contrast 1, which indicates that liquid nitrogen is used to cool the wellbore to prevent the desulfurization and denitrification product from being hydrolyzed into sulfuric acid and nitric acid, thereby achieving the effect of corrosion inhibition and speed reduction.

The acid liquid of the present disclosure can be used to dissolve a large amount of sandstone, and has better production and injection augmentation and corrosion inhibition performance than that of the desulfurization and denitrification agent of the patent CN113137215A. In addition, $[H_2Ms]^{4+}$ is used to acidify a reservoir. $[H_2Ms]^{4+}$ contains a phenoxy group that easily coordinates with $Fe^{3+}$ and $Al^{3+}$ than $[H_2Mi]^{4+}$, and thus $[H_2Ms]^{4+}$ can be adsorbed onto a pipe surface to better dissolve aluminosilicate minerals, and exhibits better production and injection augmentation and corrosion inhibition performance.

TABLE 1

Dissolution rate and corrosion rate of debris in different acid systems

| Desulfurization and denitrification agent | Dissolution rate/% | Corrosion rate/% |
|---|---|---|
| Contrast 1 | 40.50 | 0.64 |
| Contrast 2 | 30.07 | 0.59 |
| Contrast 3 | 45.66 | 0.60 |
| Example 1 | 65.44 | 0.58 |
| Example 2 | 75.50 | 0.55 |

Application 1

In 2022, an aqueous solution of 0.020 wt % [MiO$_2$][BF$_4$]$_2$ was successfully applied to desulfurization and denitrification of flue gas of P thermal power plant in T oil field. The plant adopted the desulfurization and denitrification agent of Contrast 2 before. During application, the aqueous solution of 0.020 wt % [MiO$_2$][BF$_4$]$_2$ was sprayed into flue gas, concentrations of NO$_x$ and SO$_x$ in the flue gas were detected by gas chromatography before and after the flue gas flows through a curing agent, and the desulfurization and denitrification rate was calculated, as shown in Table 2. Mass fractions of a sulfate and a nitrate in waste liquid produced by desulfurization and denitrification were measured by liquid chromatography. It can be seen that the desulfurization and denitrification efficiency of [MiO$_2$][BF$_4$]$_2$ is higher than that of bipy. Moreover, water eutrophication is treated. At the first stage, the desulfurization and denitrification agent reacts with SO$_x$ first, and the desulfurization efficiency is higher that of the second stage. Flue gas entering the second stage mainly contains NO, and thus, the denitrification efficiency of the second stage is higher than that of the first stage.

TABLE 2

Desulfurization and denitrification efficiency of curing agents prepared from H$_2$O$_2$ and bipy in different volume ratios

| Desulfurization and denitrification agent | | Desulfurization efficiency/% | Denitrification efficiency/% |
|---|---|---|---|
| Bipy + H$_2$O$_2$ | | 97.50 | 96.04 |
| [MiO$_2$][BF$_4$]$_2$ | First stage | 98.03 | 90.34 |
|  | Second stage | 94.56 | 99.48 |

Application 2

Figure 3:
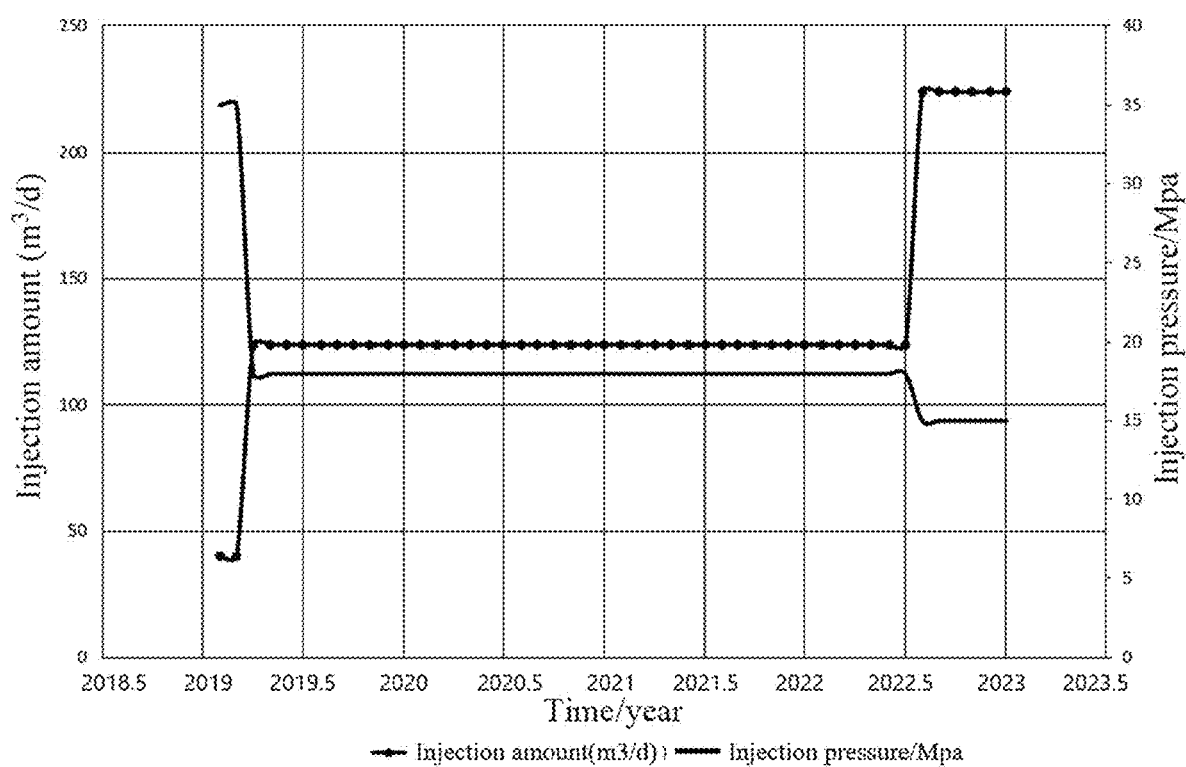
FIG. 3 is a diagram of changes in injection pressure and injection amount of a C-2 water injection well of Application 2 from 2019 to 2023.

In February 2019, the solution of Contrast 1 was used to acidify and augment injection of a C-2 water injection well of S oil field, the acid injection rate was 5 m$^3$/h, and after acidification, the injection pressure was 18 MPa, and a daily injection amount was 124 m$^3$/d. In June 2022, the injection pressure before acidification was 18 MPa, and a daily injection amount was 124 m$^3$/d. The waste liquid produced by desulfurization and denitrification in Example 2 was used for acidification and injection augmentation, an acid injection rate was 200 L/min, and after acidification, the injection pressure was 15 MPa, and a daily injection amount was 224 m$^3$/d, as shown in FIG. 3. The acidification and injection augmentation effect is available until now.

The invention claimed is:

1. A desulfurization and denitrification agent, wherein the desulfurization and denitrification agent is an imidazoline amine oxide, the imidazoline amine oxide comprises two quaternary ammonium nitrogen atoms; and
the imidazoline amine oxide further comprises a tetrafluoroborate.

2. The desulfurization and denitrification agent according to claim 1,
wherein the imidazoline amine oxide is [MiO$_2$][BF$_4$]$_2$ or [MsO$_2$][BF$_4$]$_2$;
the chemical formula of [MiO$_2$][BF$_4$]$_2$ is:

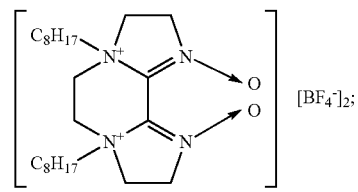

and
the chemical formula of [MsO$_2$][BF$_4$]$_2$ is:

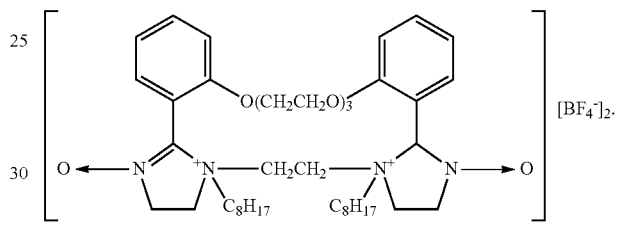

3. A synthesis method of the desulfurization and denitrification agent according to claim 1, comprising the following steps:
taking triethylenetetramine as a raw material, and dropwise adding oxalic acid or salicylic acid to react so as to obtain a gemini imidazoline intermediate;
then dropwise adding 1-fluorooctane and boron trifluoride in sequence to react so as to obtain quaternized gemini imidazolinium; and
finally adding hydrogen peroxide as an oxidizing agent to oxidize so as to obtain the desulfurization and denitrification agent.

4. An application of the desulfurization and denitrification agent according to claim 1, wherein the desulfurization and denitrification agent is applied to a desulfurization and denitrification of a flue gas and a recycling of a purified product, and the application comprises a flue gas desulfurization and denitrification process and a reservoir acidification process:
(1) wherein the flue gas desulfurization and denitrification process comprises:
spraying the desulfurization and denitrification agent into flue gas in a direction opposite to a flow direction of the flue gas at two stages to obtain waste liquid, and collecting the waste liquid produced by the desulfurization and denitrification of the flue gas in a case that a pH value of the waste liquid reaches 6 to 6.5;
wherein the waste liquid produced at the first stage is named waste liquid 1, and the waste liquid produced at the second stage is named waste liquid 2; and
(2) wherein the reservoir acidification process comprises:
from far to near relative to an oil well, injecting a slug 1, a slug 2, a slug 3, and a slug 4 in sequence to augment production and injection, wherein the slug 1 is liquid nitrogen, the slug 2 is the waste liquid 2, the slug 3 is the waste liquid 1, and the slug 4 is liquid nitrogen.

5. An application of the desulfurization and denitrification agent according to claim 2, wherein the desulfurization and denitrification agent is applied to a desulfurization and denitrification of a flue gas and a recycling of a purified product, and the application comprises a flue gas desulfurization and denitrification process and a reservoir acidification process:
  (1) wherein the flue gas desulfurization and denitrification process comprises:
  spraying the desulfurization and denitrification agent into flue gas in a direction opposite to a flow direction of the flue gas at two stages to obtain waste liquid, and collecting the waste liquid produced by the desulfurization and denitrification of the flue gas in a case that a pH value of the waste liquid reaches 6 to 6.5;
  wherein the waste liquid produced at the first stage is named waste liquid 1, and the waste liquid produced at the second stage is named waste liquid 2; and
  (2) wherein the reservoir acidification process comprises:
  from far to near relative to an oil well, injecting a slug 1, a slug 2, a slug 3, and a slug 4 in sequence to augment production and injection,
  wherein the slug 1 is liquid nitrogen, the slug 2 is the waste liquid 2, the slug 3 is the waste liquid 1, and the slug 4 is liquid nitrogen.

6. The application according to claim 4, wherein
the desulfurization and denitrification agent is an aqueous solution of $[MiO_2][BF_4]_2$ with a mass fraction of 0.010% to 0.025%, or an aqueous solution of $[MsO_2][BF_4]_2$ with a mass fraction of 0.010% to 0.025%.

7. The application according to claim 4, wherein
in the slug 1, an injection amount of liquid nitrogen is 0.1 to 0.3 $m^3$ per meter of oil layer;
in the slug 2, an injection amount of the waste liquid 2 is 10 to 50 $m^3$ per meter of oil layer;
in the slug 3, an injection amount of the waste liquid 1 is 20 to 100 $m^3$ per meter of oil layer; and
in the slug 4, an injection amount of liquid nitrogen is 1 to 1.5 $m^3$ per meter of oil layer.

8. The application according to claim 4, wherein
the waste liquid 1 comprises a mixture of a nitrate and a tetrafluoroborate of $[H_2Mi]^{4+}$ with a mass fraction of 0.010% to 0.025%, or a mixture of a nitrate and a tetrafluoroborate of $[H_2Ms]^{4+}$ with a mass fraction of 0.010% to 0.025%; and
the waste liquid 2 comprises a mixture of a nitrate, a sulphate, and a tetrafluoroborate of $[H_2Mi]^{4+}$ with a mass fraction of 0.010% to 0.025%, or a mixture of a nitrate, a sulphate, and a tetrafluoroborate of $[H_2Ms]^{4+}$ with a mass fraction of 0.010% to 0.025%.

9. The application according to claim 4, wherein
an injection rate of each slug is 100 to 250 L/min.

* * * * *